United States Patent
Sun et al.

(10) Patent No.: US 10,087,334 B2
(45) Date of Patent: Oct. 2, 2018

(54) ANTI-SLIP COATING AND PREPARATION, APPLICATION METHOD THEREOF

(71) Applicant: PPG Coatings (Tianjin) Co., Ltd., Tianjin (CN)

(72) Inventors: Meiru Sun, Tianjin (CN); Maoyi Xue, Tianjin (CN); Hailong Yan, Bozhou (CN)

(73) Assignee: PPG Coatings (Tianjin) Co., Ltd., Tianjin (CN)

( * ) Notice: Subject to any disclaimer, the term of this patent is extended or adjusted under 35 U.S.C. 154(b) by 12 days.

(21) Appl. No.: 14/419,304

(22) PCT Filed: Aug. 2, 2013

(86) PCT No.: PCT/CN2013/080701
§ 371 (c)(1),
(2) Date: Feb. 3, 2015

(87) PCT Pub. No.: WO2014/019542
PCT Pub. Date: Feb. 6, 2014

(65) Prior Publication Data
US 2017/0044385 A1  Feb. 16, 2017

(30) Foreign Application Priority Data
Aug. 3, 2012 (CN) .......................... 2012 1 0275481

(51) Int. Cl.
| | | |
|---|---|---|
| C09D 7/12 | (2006.01) | |
| B05D 3/06 | (2006.01) | |
| C09D 133/14 | (2006.01) | |
| C09D 5/00 | (2006.01) | |
| C09D 4/00 | (2006.01) | |
| C08F 222/10 | (2006.01) | |
| C08G 18/81 | (2006.01) | |
| C09D 175/04 | (2006.01) | |
| E04F 15/02 | (2006.01) | |
| E04F 15/10 | (2006.01) | |
| C08F 220/18 | (2006.01) | |
| C08F 220/34 | (2006.01) | |

(52) U.S. Cl.
CPC ............. *C09D 7/125* (2013.01); *B05D 3/067* (2013.01); *C08F 222/10* (2013.01); *C08G 18/815* (2013.01); *C09D 4/00* (2013.01); *C09D 5/00* (2013.01); *C09D 7/1283* (2013.01); *C09D 7/1291* (2013.01); *C09D 133/14* (2013.01); *C09D 175/04* (2013.01); *C08F 220/18* (2013.01); *C08F 2220/343* (2013.01); *E04F 15/02172* (2013.01); *E04F 15/105* (2013.01)

(58) Field of Classification Search
CPC .................. C08F 220/18; C08F 220/28; C08F 2220/281; C08F 2220/343; C08F 2220/1875; C08F 222/10; C08F 222/1006; C08F 2222/1013; C08F 2222/1086; C09D 133/14; C09D 175/04; C09D 4/00; C09D 5/00; C09D 7/125; C09D 7/1283; C09D 7/1291; C08L 101/00; C08L 75/02; C08G 18/815; B05D 3/067; E04F 15/02172; E04F 15/105
USPC ..... 428/423.1, 424.3; 525/50; 427/542, 553, 427/557, 558, 559
See application file for complete search history.

(56) References Cited

U.S. PATENT DOCUMENTS

| | | | | |
|---|---|---|---|---|
| 6,211,262 B1 * | 4/2001 | Mejiritski | ................ | C09D 4/00 522/100 |
| 2004/0002559 A1 * | 1/2004 | Troutman | ............... | C09D 5/185 524/100 |
| 2007/0173602 A1 * | 7/2007 | Brinkman | ......... | C08F 222/1006 524/592 |
| 2008/0145673 A1 * | 6/2008 | Bonnard | ................... | C08J 7/047 428/430 |
| 2008/0249207 A1 | 10/2008 | Whiteley et al. | | |
| 2010/0009170 A1 * | 1/2010 | Wedel | .................. | C09D 133/08 428/328 |
| 2010/0183901 A1 * | 7/2010 | Van Ginneken | ......... | C09D 5/20 428/704 |
| 2013/0101861 A1 * | 4/2013 | Cao | ....................... | C04B 41/009 428/451 |
| 2013/0202808 A1 * | 8/2013 | Dvorchak | ............ | C09D 133/14 427/517 |

FOREIGN PATENT DOCUMENTS

| | | |
|---|---|---|
| CN | 101462973 A | 6/2009 |
| CN | 101775254 A | 7/2010 |
| EP | 1072659 A1 | 1/2001 |
| JP | 6313130 A | 11/1994 |
| JP | 2004182950 | 7/2004 |
| JP | 20079592 A | 1/2007 |
| JP | 2007224084 A | 9/2007 |
| KR | 20040073698 A * | 8/2004 |
| TW | 201129576 A1 | 9/2011 |
| WO | 9929796 A1 | 6/1999 |
| WO | 0153387 A1 | 7/2001 |
| WO | 03054099 A2 | 7/2003 |
| WO | 2011014139 A1 | 2/2011 |
| WO | 2012/015560 A1 | 2/2012 |

* cited by examiner

Primary Examiner — Thao T Tran
(74) Attorney, Agent, or Firm — Justin Martinchek

(57) ABSTRACT

The present invention relates to anti-slip coatings comprising resin, diluent, PMU particles and photo-initiator. The present invention also relates to the preparation of anti-slip coatings, methods for applying anti-slip coatings, and substrates coated with such anti-slip coatings.

12 Claims, No Drawings

ANTI-SLIP COATING AND PREPARATION, APPLICATION METHOD THEREOF

FIELD OF THE INVENTION

The present invention relates to anti-slip coatings, comprising PMU particles as an anti-slip agent. The present invention also relates to the preparation of anti-slip coatings, methods for applying anti-slip coatings, and substrates coated at least in part with anti-slip coatings.

BACKGROUND OF THE INVENTION

In recent years, vinyl floorings have been widely used in homes, and commercial and industrial buildings because of their superior performance, convenient construction, and low-cost. Usually the vinyl floorings are required to be anti-slippery, especially when applied to places prone to be covered with water and/or oil, for example, corridors, stairs, toilets, washbasins, kitchens, bathrooms, swimming pools, working spaces, etc. The anti-slippery function of vinyl flooring is usually achieved by applying anti-slip coating on its surface. Currently, a variety of anti-slip coating materials are commercially available, however many of them have many disadvantages, for example, the cured coating is too thick, and/or the anti-slip performance is poor.

To improve performance, in some cases, a matting agent is added into the coating to reduce the surface gloss of the coating. Commonly used matting agents include ultrafine synthetic silica, micronized wax, metallic stearate such as aluminum, calcium, magnesium, and zinc stearate, and so on. However, the addition of matting agents can impair the anti-slip performance of the coating. The widely-used standard for anti-slip testing is German DIN 51130. Currently, commonly used anti-slip coatings can only reach the level of R8-R9 in the DIN 51130 test, and thus fail to meet the requirement for the European market. Therefore, anti-slip coatings which can achieve R10, even R11 in DIN 51130 test are desired.

SUMMARY OF THE INVENTION

In embodiments the present invention is directed to anti-slip coatings comprising resin, diluent, PMU particles, and photo-initiator. Embodiments of the anti-slip coating of the present invention do not comprise solvent.

In another aspect, embodiments of the invention provide methods for preparing anti-slip coatings comprising: adding resin, diluent, and photo-initiator into a mixer to disperse to obtain mixture A; mixing a portion of PMU and anti-slip agent ceramic particles and a portion of mixture A, and then dispersing in a disperser to obtain mixture B; mixing the remaining portion of PMU and anti-slip agent, and a portion of mixture A, and then dispersing in a disperser to obtain mixture C; and mixing the remaining mixture A, and mixtures B and C in a mixer to obtain the anti-slip coatings of the present invention.

In another aspect, embodiments of the invention provide methods for applying an anti-slip coating of the present invention on a substrate comprising: applying the anti-slip coating of the present invention on all or part of a substrate; treating the coated substrate with infrared radiation; and curing the treated substrate by exposing the coating to ultraviolet radiation. Substrates coated at least in part with anti-slip coating are also within the scope of the invention.

DETAILED DESCRIPTION OF THE INVENTION

The anti-slip coatings of the present invention comprise PMU particles in place of wax material, which is widely used in currently existing anti-slip coatings, and optionally comprise ceramic microsphere particles as auxiliary anti-slip particles. The content of each component thereafter, except where noted, is based on the total weight of the coating.

The anti-slip coatings of the present invention comprise a resin, a diluent, PMU particles, a photo initiator and/or adjuvants.

The resin is selected from commonly used resins for UV curable resins, including but not limited to polyester acrylates and polyurethane acrylates. In embodiments the resin can be a urethane acrylate resin, or an aliphatic urethane acrylate resin. The aliphatic urethane acrylate resin has good adhesion on PVC substrates, and excellent hardness and flexibility. The content of resin comprises about 20 to about 60% by weight, or about 35 to about 50% by weight.

The diluent comprises an active (meth)acrylate such as heterocyclyl (meth)acrylate, bis-functional (meth)acrylates and aliphatic (meth)acrylate. The heterocyclyl (meth)acrylates may be selected from tetrahydrofuran acrylate (THFA), cyclic trimethyllolpropane formal acrylate (CTFA), or N-acryloyl morpholine (acrylmorpholide), and in certain embodiments the heterocyclyl (meth)acrylate is tetrahydrofuran acrylate. The bifunctional (meth) acrylates may be selected from tripropylene glycol diacrylate (TPGDA), polyethylene glycol diacrylate, 1,6-hexanediol diacrylate (HDDA), 1,6-hexanediol diacrylate dimethacrylate (HDDMA) and dipropylene glycol diacrylate, and in certain embodiments the difunctional (meth)acrylate is tripropylene glycol diacrylate. The aliphatic (meth)acrylates may be selected from straight-chain or branched $C_8$-$C_{12}$ alkyl (meth)acrylates, and in certain embodiments the aliphatic (meth)acrylate is isodecyl acrylate. The active (meth)acrylate as diluent is used for diluting oligomer, participating in light curing reaction, and affecting performance of the coating including curing rate and flexibility. The content of diluent comprises 15 to 55% by weight, or 30 to 50% by weight.

The matting agent comprises PMU (polymethyl urea) particles. The PMU particles have an average dispersed particle diameter of 50 to 200 microns. The content of PMU comprises 3 to 25% by weight, or in other embodiments 8 to 15% by weight.

PMU is a special organic polymer with a high specific surface area, and low bulk density characteristics, which can be used in the coating industry as a matting agent. It has been surprisingly discovered in the present coatings, that when PMU is used as a matting agent, it not only achieves a significant matting effect, but also significantly improves the anti-slip performance of the coating. This is a surprising result as those skilled in the art would not have expected the anti-slip performance to improve. The present invention uses PMU instead of silica or micronized wax as matting agent in the anti-slip coating to not only achieve significant matting effect, but also significantly improve anti-slip performance PMU can impart advantages, including significant matting effect, less thickening effect compared with conventional inorganic matting agents, and/or having little effect on thixotropy. PMU can be particularly suitable in aqueous systems in addition to solvent-based system. PMU is especially suitable for UV curing systems since it does not absorb UV light because of its high transparency.

The type and content of photo-initiators are well known to persons skilled in the art, and the photo-initiator may be selected from benzophenone photo-initiator, Irgacure 184, Irgacure 754, Irgacure 369, TPO, Darocur 1173 and other well known photo-initiators in the art, wherein Irgacure series and Darocure series are products of Swiss company Ciba Specialty Chemicals, and its product models are well known to persons skilled in the art. Preferably the photo-initiator is one or more selected from the group consisting of benzophenone photo-initiator, Darocure 1173, and Irgacure 754 photo-initiator. The content of photo-initiator comprises 2 to 10% by weight, or in certain embodiments 3 to 9% by weight.

The anti-slip coatings of the present invention optionally also comprise ceramic microsphere particles, the main component of which is silicon dioxide. The ceramic microsphere particles also function as matting agent and anti-slip agent. Compared with PMU as the primary matting agent and anti-slip agent, the ceramic microsphere particles play a supporting role, as auxiliary matting agents and auxiliary anti-slip agents and can help to improve the anti-slip performance of the coating. The ceramic microsphere particles have an average particle diameter D50 of 3.5 micrometers. The content of ceramic microsphere particles comprises 0.1 to 3% by weight, or 0.5 to 2% by weight.

The anti-slip coatings of the present invention optionally also comprise one or more auxiliaries commonly used in UV curing coatings, including defoamer, leveling agent, lubricant and dispersant. The types and amounts of auxiliaries are well known to those persons skilled in the art, for example, defoaming agent can be selected from EFKA2022, EFKA2527, BYK352, BYK354, AIREX 910, AIREX 920, wherein EFKA series are products of EFKA, BYK series are products of BYK, and AIREX series are product of TEGO. The content of auxiliaries is about 0.1 to about 1% by weight, or about 0.1 to about 0.3% by weight.

In embodiments the anti-slip coatings of the present invention do not contain a solvent. Thus they can be less harmful to human body, low fire hazard, and good environmental friendly.

The anti-slip coatings of the present invention may be applied to any of the substrates known in the art, for example, automotive substrates, industrial substrates, packaging substrate, floors and furniture. The substrate may be metallic or non-metallic. The metal substrates include, for example, steel, tin-plated steel, galvanized steel, aluminum, aluminum foil. Non-metallic substrates include polymers, plastics, polyester, polyolefin, polyamide, cellulose, polystyrene, polyacrylic acid, poly (ethylene naphthalate ester), polypropylene, polyethylene, nylon, EVOH, polylactic acid, poly (ethylene terephthalate) (PET), polycarbonate, polycarbonate, acrylonitrile butadiene styrene (PC/ABS), polyamide, wood, wood composite panels, cement, stone, glass, paper, cardboard, textiles, leather, including synthetic and natural leathers, as well as other non-metallic substrates. In embodiments, the anti-slip coating of the present invention may be applied to polyvinyl chloride (or as referred to herein as PVC or vinyl) substrate, wooden substrate and/or polyurethane substrate. In certain embodiments the anti-slip coating is applied to floors or flooring, such as flooring made of polyvinyl chloride. Accordingly, the present invention is further directed to a substrate coated at least in part with the coating of the present invention, wherein the substrate comprises flooring. "Flooring" is used herein in its broadest sense and includes all types of floors and flooring, such as but not limited to wood, PVC, and polyurethane floors and floor materials and the like, which may or may not have been pretreated or coated with one or more other coatings.

In embodiments an object of the present invention is to improve the anti-slip performance of anti-slip coatings. In certain embodiments the coatings can be used as matte anti-slip coatings for vinyl flooring to provide superior anti-slip performance. The anti-slip coatings of the present invention can provide not only a thin layer of coating but also a coating with superior anti-slip performance.

The anti-slip coating of the present invention may be applied by any standard technique in the art for coating, including but not limited to roll coating, spraying coating, curtain coating, blade coating, dip coating, and brush coating. In embodiments, the anti-slip coating of the present invention may be applied by roll coating.

A method for preparing the anti-slip coatings of the present invention, comprises:

a. adding aliphatic urethane (meth)acrylate, active (meth) acrylate and photo-initiator into a mixer to disperse to obtain mixture A;

b. mixing about 40 to 50% by weight of total amount of the PMU and ceramic particle, and about 20 to 50% by weight of mixture A, then dispersing in a disperser until reaching Hegman fineness rating of about 50 to about 90 micron, mixture B obtained;

c. mixing the remaining portion of total amount of the PMU and ceramic particle, and about 20 to about 50% by weight of mixture A, then dispersing in a disperser until reaching Hegman fineness rating of >=90 micron, mixture C obtained; and d. mixing the remaining mixture A, and the mixtures B and C in a mixer to obtain the anti-slip coating.

A method for applying the anti-slip coatings of the present invention on a substrate, including PVC substate, wooden substate, and/or polyurethane substrate, comprises:

a. applying the anti-slip coating of the present invention on the substrate by, for example, roll coating, in an amount of about 6 to about 35 grams of the anti-slip coating per squre meters, or about 8 to about 20 grams per square meters;

b. treating the anti-slip coating with infrared radiation, at a temperature of about 50 to 70 degrees Celcius, or about 60 to 65 degrees Celcius, for about 0.5 to 2 mintues, or about 1 minute;

c. curing the anti-slip coating by exposing the coating to ultraviolet radiation.

By calculation, the cured anti-slip coatings of the present invention comprise a thickness of about 6 to about 35 micron, or about 8 to 20 microns. The test results show that the anti-slip coatings of the present invention thus have a thin thickness and have excellent anti-slip performance.

For purposes of this description, it is to be understood that the invention may assume various alternative variations and step sequences, except where expressly specified to the contrary. Moreover, other than in any operating examples, or where otherwise indicated, all numbers expressing values, ranges, amounts or percentages, for example, quantities of ingredients, used in the specification and claims may be read as if prefaced and as being modified in all instances by the term "about," even if the term does not expressly appear. Also, it should be understood that any numerical range recited herein is intended to include the endpoints of those ranges and all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used in this specification and the appended claims, singular encompasses plural and vice versa, unless specifically stated otherwise. For example, although reference is made herein to the articles "a," "an," and "the," plural referents are included unless expressly and unequivocally limited to one referent. For example, although reference is made herein to "a" PMU particle, "a" photo-initiator and the like, one or more of each of these components, and of any other components, can be used. In addition, in this application, the use of "or" means "and/or" unless specifically stated otherwise, even though "and/or" may be explicitly used in certain instances. "Including," "for example," "such as" and like terms means including, for example, such as, but not limited to.

The various embodiments and examples of the present invention as presented herein are each understood to be non-limiting with respect to the scope of the invention.

The invention will be further described by reference to the following examples.

The following examples are merely illustrative of the invention and are not intended to be limiting.

EXAMPLES

The following examples are presented to demonstrate the general principles of the invention. The Examples describe the preparation of anti-slip coatings according to embodiments of the present invention and methods of preparation. All amounts listed are described in parts by total weight, unless otherwise indicated. The invention should not be construed as limited to the specific examples presented.

Example 1: Preparation of an Anti-Slip Coating

The formulation is as below, based on the total weight of the anti-slip coating:

| | |
|---|---|
| Aliphatic urethane acrylate | 39%; |
| Tetrahydrofuran acrylate | 20.4%; |
| Tripropylene glycol diacrylate | 8%; |
| Isodecyl acrylate | 9%; |
| PMU particles | 14%; |
| Ceramic microsphere particle | 1%; |
| Benzophenone photo-initiator | 3.5%; |
| DAROCUR 1173 | 3%; |
| IRGACURE754 | 2%; and |
| Defoamer | 0.1%. |

The anti-slip coating is prepared in accordance with the following steps:
 a. adding aliphatic urethane acrylate, tetrahydrofuran acrylate, tripropylene glycol diacrylate, isodecyl acrylate, photo-initiator and defoamer into a mixer to disperse to obtain mixture A;
 b. mixing about 40 to 50% by weight of total amount of the PMU and ceramic particle, and about 20 to 50% by weight of mixture A, then dispersing in a disperser until reaching Hegman fineness rating of about 50 to about 90 micron, mixture B is obtained;
 c. mixing the remaining portion of total amount of the PMU and ceramic particles, and about 20 to about 50% by weight of mixture A, then dispersing in a disperser until reaching Hegman fineness rating of >=90 micron, mixture C is obtained;
 d. mixing the remaining mixture A, and the mixtures B and C in a mixer to obtain the anti-slip coating.

Example 2: Preparation of an Anti-Slip Coating

The formulation is as below, based on the total weight of the anti-slip coating:

| | |
|---|---|
| Aliphatic urethane acrylate | 50%; |
| Tetrahydrofuran acrylate | 12.8%; |
| Tripropylene glycol diacrylate | 9%; |
| Isodecyl acrylate | 12%; |
| PMU particles | 9%; |
| Ceramic microsphere particles | 2%; |
| Benzophenone photo-initiator | 2%; |
| DAROCUR 1173 | 2%; |
| IRGACURE754 | 1%; and |
| Defoamer | 0.2%. |

The anti-slip coating is prepared in accordance with the procedure described in Example 1.

Example 3: Preparation of an Anti-Slip Coating

The formulation is as below, based on the total weight of the anti-slip coating:

| | |
|---|---|
| Aliphatic urethane acrylate | 35%; |
| Cyclic trimethyllolpropane formal acrylate | 15%; |
| Tripropylene glycol diacrylate | 15%; |
| Isodecyl acrylate | 16.9%; |
| PMU particles | 15%; |
| Benzophenone photo-initiator | 2%; |
| DAROCUR 1173 | 1%; and |
| Defoamer | 0.1%. |

The anti-slip coating is prepared in accordance with the procedure described in Example 1, except for using Cyclic trimethyllolpropane formal acrylate instead of Tetrahydrofuran acrylate, and not using Ceramic microsphere particles.

Comparative Example 1: Preparation of an Anti-Slip Coating

The formulation is as below, based on the total weight of the anti-slip coating:

| | |
|---|---|
| Aliphatic urethane acrylate | 40%; |
| Tetrahydrofuran acrylate | 13%; |
| Tripropylene glycol diacrylate | 15%; |

-continued

| | |
|---|---|
| Isodecyl acrylate | 8.9%; |
| Aluminius trioxide | 8%; |
| Silica filler | 8%; |
| Ceramic microsphere | 1% |
| Benzophenone photo-initiator | 2%; |
| DAROCUR 1173 | 3%; |
| IRGACURE 754 | 1%; and |
| Defoamer | 0.1%. |

The anti-slip coating of comparative example 1 is prepared in accordance with the procedure described in Example 1, except for using alimunius trioxide and silica filler instead of PMU particles.

Coating Example 1: Application of an Anti-Slip Coating

The anti-slip coatings prepared in Example 1-3 and comparative example 1 were applied and cured in accordance with the following steps to form an anti-slip coating layer:

Step 1. the anti-slip coatings of the present invention were applied on PVC substrates by roll coating in amounts of about 12 grams of the anti-slip coating per square meters;

Step 2. the coated substrates were then treated with infrared radiation, at a temperature of about 65 degrees Celcius, for about 1 minute;

Step 3 The treated substrates were then exposed to ultraviolet radiation, to obtain a layer of coating with a thickness of about 12 microns.

In the DIN 51130 test, the cured anti-slip coatings of Examples 1-3 resulted with angles having inclinations greater than 20°, which is rated as R11. To the contrary, the cured anti-slip coating of comparative example 4 obtained a result of angle of inclination of 9°, which is rated as R9, see Table 1. The test results demonstrate that the anti-slip coatings of the present invention comprising PMU particles achieve an unexpected better anti-slip performance, compared with the coating of comparative example which does not comprise PMU particles.

TABLE 1

| | Example 1 | Example 2 | Example 3 | Comparative Example 1 |
|---|---|---|---|---|
| DIN 51130 Test Results | R11 | R11 | R11 | R9 |

Whereas particular embodiments of this invention have been described above for purposes of illustration, it will be evident to those skilled in the art that numerous variations of the details of the present invention may be made without departing from the invention as defined in the appended claims. It is understood, therefore, that this invention is not limited to the particular embodiments disclosed, but it is intended to cover modifications that are within the spirit and scope of the invention, as defined by the appended claims.

The invention claimed is:

1. An anti-slip coating comprising: based on a total weight of the coating,
    a. an aliphatic urethane (meth)acrylate in amounts of 20-60%;
    b. active (meth)acrylate monomers in amounts of 10-55%;
    c. polymethyl urea particles in amounts of 3-25%;
    d. a photo-initiator in amounts of 2-10%;
    e. ceramic microsphere particles in amounts of 0.1-3% by weight; and
    f. auxiliaries in amounts of 0.1-1% by weight.

2. The anti-slip coating according to claim 1, wherein the polymethyl urea particles have an average dispersed particle size of 50 to 200 microns.

3. The anti-slip coating according to claim 1, wherein the active (meth)acrylate monomers comprise a heterocyclic (meth)acrylate, a bifunctional (meth)acrylate, and/or an aliphatic (meth)acrylate.

4. The anti-slip coating according to claim 1, wherein the anti-slip coating is free of a solvent.

5. A method for coating a substrate with the anti-slip coating of claim 1, comprising:
    a. applying the anti-slip coating according to claim 1 on at least a part of the substrate;
    b. treating the coated substrate with infrared radiation; and
    c. curing the coated substrate by exposing the coating to ultraviolet radiation.

6. The method of claim 5, wherein the substrate is polyvinyl chloride.

7. The method according to claim 5, wherein the anti-slip coating is applied at 6-35 grams per square meter on the substrate.

8. The method according to claim 5, wherein the cured anti-slip coating has a thickness of 6-35 microns.

9. A substrate coated at least in part with the coating of claim 1.

10. The substrate of claim 9, wherein the substrate is a flooring.

11. The substrate of claim 9, wherein the substrate is a vinyl floor.

12. A method for preparing an anti-slip coating, comprising:
    a. mixing an aliphatic urethane (meth)acrylate, active (meth)acrylate monomers and a photo-initiator in a mixer to disperse to obtain mixture A;
    b. mixing 40 to 50% by weight of total amount of the polymethyl urea and ceramic particles, and 20 to 50% by weight of mixture A, then dispersing in a disperser until reaching Hegman fineness rating of 50 to 90 microns, to obtain mixture B;
    c. mixing the remaining portion of total amount of the polymethyl urea and ceramic particles, and 20 to 50% by weight of mixture A, then dispersing in a disperser until reaching Hegman fineness rating of >=90 micron, to obtain mixture C; and
    d. mixing the remaining mixture A, and the mixtures B and C in a mixer to obtain the anti-slip coating.

* * * * *